(12) United States Patent
Oakley et al.

(10) Patent No.: US 9,830,068 B2
(45) Date of Patent: Nov. 28, 2017

(54) DUAL CONFIGURATION COMPUTER

(71) Applicant: Intel Corporation, Santa Clara, CA (US)

(72) Inventors: Nicholas W. Oakley, Portland, OR (US); Chee Soon Lew, Butterworth (MY); Bin Yun Soon, Butterworth (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/127,918

(22) PCT Filed: Jun. 26, 2013

(86) PCT No.: PCT/US2013/047813
§ 371 (c)(1),
(2) Date: Dec. 19, 2013

(87) PCT Pub. No.: WO2014/105182
PCT Pub. Date: Jul. 3, 2014

(65) Prior Publication Data
US 2015/0286359 A1    Oct. 8, 2015

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 1/1637* (2013.01); *G06F 1/1643* (2013.01); *G06F 3/0416* (2013.01); *G06F 3/1423* (2013.01)

(58) Field of Classification Search
CPC .... G06F 3/0416; G06F 3/1423; G06F 1/1637; G06F 1/1643
See application file for complete search history.

(56) References Cited

U.S. PATENT DOCUMENTS 6,466,202 B1* 10/2002 Suso ............... G06F 1/1616
345/158
8,941,683 B2  1/2015 Son et al.
(Continued)

FOREIGN PATENT DOCUMENTS

JP    2005149109 A    6/2005
JP    2006053629 A    2/2006
(Continued)

OTHER PUBLICATIONS

International Search Report and Written Opinion received for PCT Patent Application No. PCT/US2013/047813, dated Oct. 15, 2013, 14 pages.
(Continued)

*Primary Examiner* — Liliana Cerullo
(74) *Attorney, Agent, or Firm* — Barnes & Thornburg LLP

(57) ABSTRACT

In general, in one aspect, a laptop computer that maintains at least a subset of its operational capability (e.g., some display visibility, some user interface ability) in a closed configuration. The base includes a transparent surface to enable at least part of the display to be visible from the bottom when in the closed configuration. The transparent surface is touch sensitive to enable a touchscreen user interface with the display in the closed configuration and a touchpad user interface with the display in an open configuration. The transparent surface may display varying portions of the user interface device and possibly other images in the open configuration. The laptop computer may function as a tablet in the closed configuration.

29 Claims, 8 Drawing Sheets

(51) Int. Cl.
  *G06F 1/16*   (2006.01)
  *G06F 3/041*  (2006.01)
  *G06F 3/14*   (2006.01)

(56) References Cited

U.S. PATENT DOCUMENTS

| | | | |
|---|---|---|---|
| 2009/0295731 A1* | 12/2009 | Kim | G06F 1/1616 345/168 |
| 2010/0277439 A1* | 11/2010 | Charlier | G06F 1/1616 345/176 |
| 2011/0047459 A1* | 2/2011 | Van Der Westhuizen | G06F 1/1692 715/702 |
| 2011/0124376 A1 | 5/2011 | Kim et al. | |
| 2011/0163986 A1* | 7/2011 | Lee | G06F 1/1692 345/173 |
| 2011/0242750 A1* | 10/2011 | Oakley | G06F 1/1637 361/679.27 |
| 2011/0291979 A1* | 12/2011 | Sahashi | G06F 3/04886 345/173 |
| 2012/0094720 A1 | 4/2012 | Choi et al. | |
| 2012/0105428 A1* | 5/2012 | Fleck | G06F 3/1431 345/419 |
| 2012/0235949 A1* | 9/2012 | Ligtenberg | G06F 1/1616 345/174 |
| 2012/0256886 A1* | 10/2012 | Ryu | G06F 1/1632 345/204 |
| 2012/0306749 A1 | 12/2012 | Liu et al. | |
| 2013/0113682 A1* | 5/2013 | Heizer | G06F 3/1423 345/1.1 |
| 2013/0155590 A1* | 6/2013 | Tani | H04M 1/0237 361/679.01 |
| 2013/0271378 A1* | 10/2013 | Hulford | G06F 3/14 345/168 |

FOREIGN PATENT DOCUMENTS

| | | |
|---|---|---|
| KR | 20100007127 | 1/2010 |
| WO | 2012/047208 A1 | 4/2012 |

OTHER PUBLICATIONS

English Translation of Search Report of R.O.C. Patent Application 102146094 (associated TW application) dated Aug. 24, 2015, 1 page.
English Translation of The Notice of Preliminary Rejection for KR Patent Application 2015-7014211 (associated KR application) dated Apr. 11, 2016, 7 pages.
English Translation of The Notice of Reasons for Rejection for JP Patent Application 2015-544061 (associated JP application) dated Jun. 21, 2016, 3 pages.

* cited by examiner

DUAL CONFIGURATION COMPUTER

BACKGROUND

Traditional laptops or notebook computers require the notebook computer to be open in order to view displayed information or interact with the notebook. As a result, most users today only use their notebook computers when they are stationary such as while they are at their desk or when they are sitting at a coffee shop. An ergonomic drawback of current notebook computer designs is that they are not conducive to being used while the user is in motion, such as when walking, or when the user is standing because the display of the notebook computer is typically viewable only when the lid of the notebook computer is open.

Tablet devices typically include a display for presenting information that is touch sensitive and thus provides a user interface. Tablet devices thus enable a user to interact with the device without needing to open the device. Accordingly, tablet devices may be used while a user is in motion. However, a drawback is that the tablets provide a limited user interface as there is no full keyboard or the like for interacting therewith and utilizing a keyboard on the touch-screen limits the visible are of the display.

BRIEF DESCRIPTION OF THE DRAWINGS

The features and advantages of the various embodiments will become apparent from the following detailed description in which.

DETAILED DESCRIPTION

The display of a laptop computer often acts as a lid that rests upon a keyboard acting as the base when closed. The top surface of the display (lid) is often referred to as the A surface, the display side of the lid is often referred to as the B surface, the keyboard side of the base is often referred to as the C surface, and the underside of the base is often referred to as the D surface. These letters may be utilized herein, and on the drawings, for ease of illustrations, description and/or understanding.

When closed neither the display (B surface) nor the keyboard (C surface) is accessible (no operational capability). It would be beneficial to provide a laptop that maintained at least a subset of its operational capability (e.g., some display visibility, some user interface ability). Using a transparent surface as at least part of the base could enable at least part of the display to be visible from the bottom (through the D surface) when in a closed configuration. If the transparent surface was touch sensitive it could enable the user to interface with the at least part of the display that was visible therethrough in the closed configuration. In an open configuration the touch sensitive aspect could act as a user interface (e.g., touchpad). If the transparent surface included a transparent display, for example a transparent liquid crystal display (LCD) and/or transparent organic light emitting diode (OLED), images could be presented thereon. The images could be, for example user interfaces, to provide additional interfacing options with the computer.

Figure 1A:
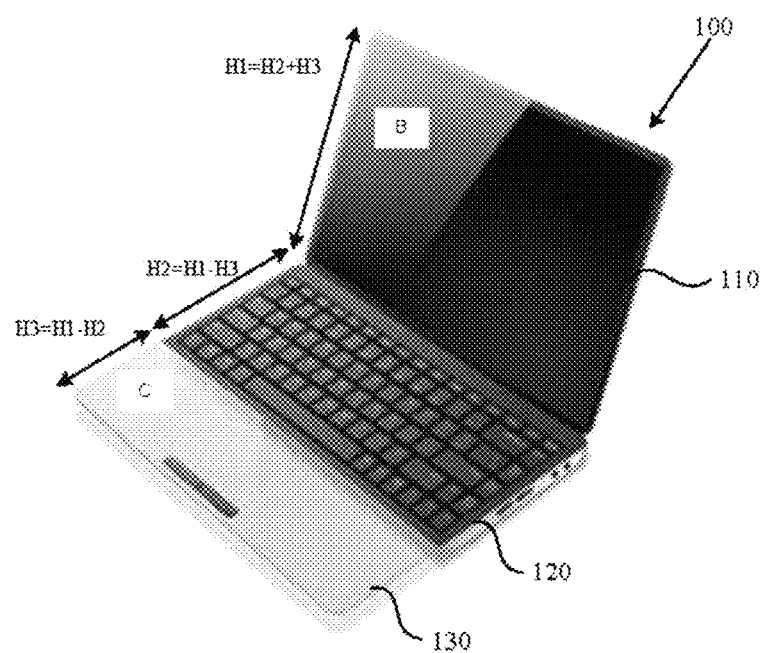
FIG. 1A illustrates an example lap top computer in an open configuration, according to one embodiment.

FIG. 1A illustrates an example lap top computer 100 in an open configuration. The computer 100 includes a display 110 and a keyboard 120 that are pivotally connected to each other via a hinge or the like (not numbered). The keyboard 120 has a height (H2) that is shorter than the height (H1) of the display 110 so that when closed the keyboard 120 would not cover the entire display 110. Extending from the bottom of the keyboard 120 is a transparent surface 130. The combined height (H2+H3) of the keyboard 120 and the transparent surface 130 acting as the base is approximately the height of the display 110 acting as the lid. The transparent surface 130 may act as touch screen interface on both sides (to be described in more detail later). The display 110 is for viewing content, the keyboard 120 is a user interface, and the transparent surface 130 may act as a palm rest and also act as a user interface. A portion of the transparent surface 130 may be defined as a user interface region and thus be touch sensitive (e.g., touchpad defined below the spacebar). The touches and/or movements within this region may be processed by the computer 100 so the appropriate actions are taken on the display 110.

Figure 1B:
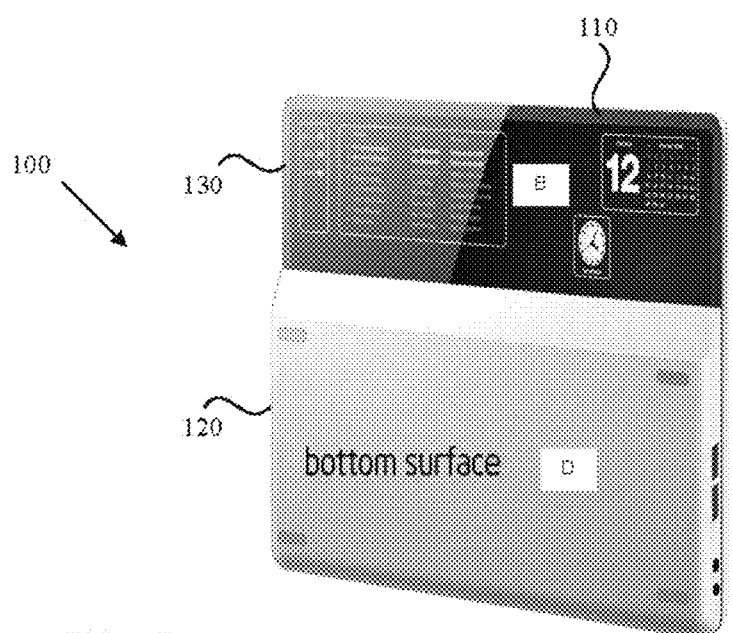
FIG. 1B illustrates the example lap top computer in a closed configuration, according to one embodiment.

FIG. 1B illustrates the example lap top computer 100 in a closed configuration. As illustrated, the bottom surface of the keyboard 120 (D surface) only covers a portion of the display 110 so that a portion of the display 110 is visible through the transparent surface 130. The transparent surface 130 that is covering the display 110 may be touch sensitive so that a user can interact with the portion of the display 110 that is visible. The transparent surface 130 acts as a touch-screen interface on the display 110.

The computer 100 may determine when it is in a configuration for viewing through the transparent surface 130 (e.g., closed and oriented such that the bottom of the keyboard 120 is facing user). The user may enter and/or exit a mode where content is viewable via the transparent surface 130 via some user interface (e.g., button) or some action (e.g., shake the computer 100). When it is determined that the computer 100 has entered this mode the computer 100 may limit the operation of the display 110 to approximately the portion of the display 110 that will be visible through the transparent surface 130. That is, the portion of the display 110 covered by the keyboard 120 may be powered off. The content displayed in the portion of the display 110 in this mode may be a standard presentation of information (which may be at least partially user defined) or may depend on what mode the computer 100 was in prior to entering this mode.

For example, if the computer 100 was in an open and operational configuration and then it was determined that the computer 100 was closed and orientated such that the bottom of the keyboard 120 (D surface) was facing the user, a portion of the display 110 may be powered down and the content displayed on the remaining portion of the display 110 may be a scaled down vision of what had been presented on the whole display 110 (e.g., reduced version of a document that was being displayed, a reduced version of each of the programs that was being displayed). In addition to powering down a portion of the display 110, the computer 100 may selectively shut down the backlight for further power savings in the closed mode. The content that is displayed may be configured by the user. The computer 100 may monitor what the user does with the content when entering this mode and may modify how it initially presents content based on what it learns from tracking.

If the computer 100 was in a closed and off configuration and it was determined that the user wanted to utilize the computer 100 in a closed mode, a portion of the display 110 covered by the transparent surface 130 may be powered on. The content provided on the display 110 may initially be certain desirable data (e.g., calendar, clock) and/or access to other programs or content (e.g., emails, to do lists). The content that is displayed may be configured by the user. The computer 100 may monitor what the user does with the content when entering this mode and may modify how it initially presents content based on what it learns from tracking.

The computer 100 may be able to determine the orientation thereof in the closed mode in order to determine how the content should be presented. That is, as illustrated in FIG. 1B the transparent surface 130 is along a top edge of the C surface and the content is visible along the top edge (presented in landscape format). If the computer 100 was rotated so that the transparent surface 130 was along a right edge the content presented would not be viewable as such (landscape format presented on portrait display). Accordingly, the computer 100 may determine its orientation using for example, a 3-axis accelerator, and may adjust the presentation of the content on the display 110 based thereon. In the above noted example, the content could be presented in portrait format if it was determined that the computer 100 had been rotated to a portrait configuration.

Figure 2:
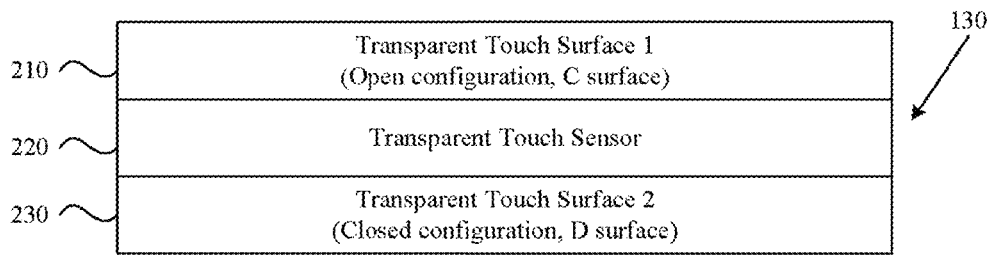
FIG. 2 illustrates a high level layout of an example transparent touch sensitive surface, according to one embodiment.

FIG. 2 illustrates a high level layout of an example transparent touch sensitive surface 130. The transparent surface 130 may constructed using capacitive touch-sensitive technology, resistive touch-sensitive technology, or any other suitable touch-sensitive technology. The transparent surface 130 may include a first touch surface layer 210, a touch sensor 220 and a second touch surface layer 230. The first touch surface layer 210 may face the upper side of the keyboard (C surface) and receive touches in an open configuration. The second touch surface layer 230 may face the underside of the keyboard (D surface) and receive touches in a closed configuration. The first touch surface layer 210 and the second touch surface layer 230 may include one or more glass sheets, plastic sheets, sheets of any suitable transparent (or semi-transparent material), or some combination thereof.

The touch sensor 220 may be deposed between first touch surface layer 210 and second touch surface layer 230. The touch sensor 220 may be configured to detect a first touch input associated with the first touch surface layer 210 and a second touch input associated with second touch surface layer 230. The touch sensor 220 may be touch-sensitive to, for example, a user's finger, a stylus, a pen, or some combination thereof.

Touches (or contacts) by a user on the first touch surface layer 210 and the second touch surface layer 230 are interpreted differently by the computer 100 depending on whether the computer 100 is in an open configuration or a closed configuration. For example, when the computer 100 is in an open configuration touches on the first touch surface layer are interpreted by computer 100 as touches on a touchpad. When the computer 100 is in a closed configuration touches on the second touch surface layer are interpreted by the computer 100 as touchscreen touches on the display 110.

If the transparent surface 130 was a display, one or more images of, for example, different user interfaces could be presented thereon and interacting with the illuminated images could cause those actions to be taken.

Figure 3A:
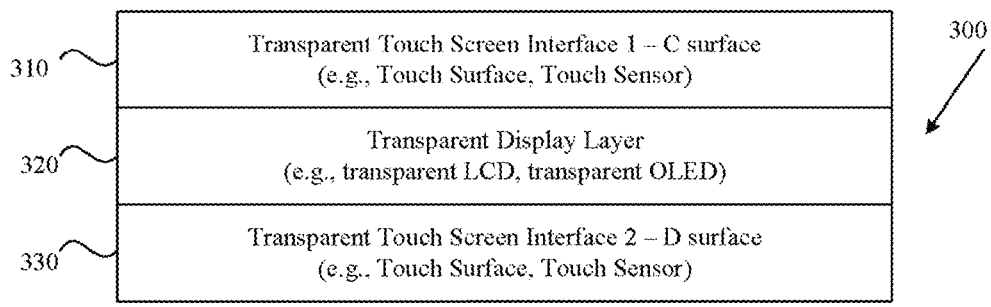
FIG. 3A illustrates a high level layout of an example transparent touch sensitive display, according to one embodiment.

FIG. 3A illustrates a high level layout of an example transparent touch sensitive display 300. The transparent display 300 may include a first touch screen interface 310, a display layer 320 and a second touch screen interface 330. The first touch screen interface 310 may face the C surface and receive touches in an open configuration. The second touch screen interface 330 may face the D surface and receive touches in a closed configuration. The first and the second touch screen interfaces 310, 330 may include a touch surface layer and a touch sensor. The transparent display layer 320 may present images thereon which may be, for example, different types of user interfaces. The transparent display layer may be transparent liquid crystal display (LCD) or a transparent organic light emitting diode (OLED) as would be known to those skilled in the art. The transparent LCD may include a sheet of glass that the images are presented on but it does not include any backlighting to present the images. The transparent OLED includes lighting to present the images. Accordingly, the transparent OLED can be used in darker environments. In lighted environments, the transparent OLED is best used if you darken behind the transparent display 300 (e.g., set on a dark surface).

Figure 3B:
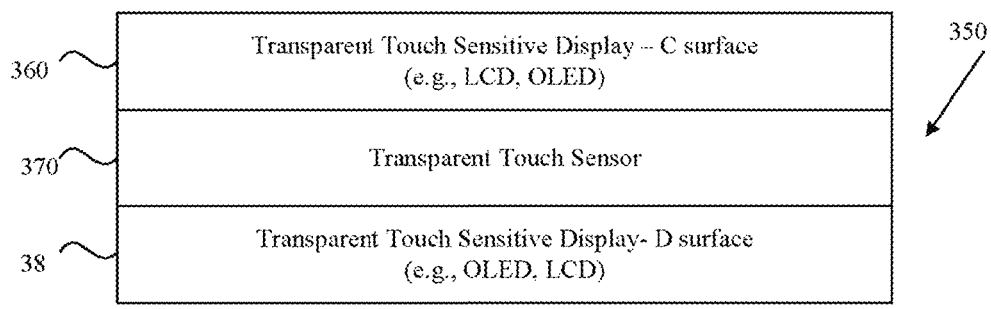
FIG. 3B illustrates a high level layout of an example transparent touch sensitive display capable of presenting different format images, according to one embodiment.

FIG. 3B illustrates a high level layout of an example transparent touch sensitive display 350 capable of presenting different format images (lighted and non-lighted). The transparent display 350 may include a first transparent touch sensitive display e.g., transparent LCD, transparent OLED) 360, a second include a first transparent touch sensitive display (e.g., transparent OLED, transparent LCD) 380, and a touch sensor 370 deposed therebetween. The first touch sensitive display 360 may face the C surface and receive touches in an open configuration. The second touch sensitive display 380 may face the D surface and receive touches in a closed configuration.

The touch sensor 370 may be configured to detect a first touch input associated with the first touch sensitive display 360 when the computer is in an open configuration. The first touch input touches may be interpreted by the computer as touches on a touchpad. The touch sensor 370 may be configured to detect a second touch input associated with the second touch sensitive display 380 when the computer is in a closed configuration. The second touch input touches may be interpreted by the computer as touches on a touchscreen. The touch sensor 370 may be touch-sensitive to, for example, a user's finger, a stylus, a pen, or some combination thereof.

The transparent display 360, 380 utilized to present the one or more images in an open configuration may be selected based on whether backlighting is desired or not. The selection may be based on the environment the computer is being used in. For example, if ambient lighting is available the images may be presented by a transparent LCD display. If the environment is dimly lit the images may be presented by a transparent OLED.

Figure 4A:
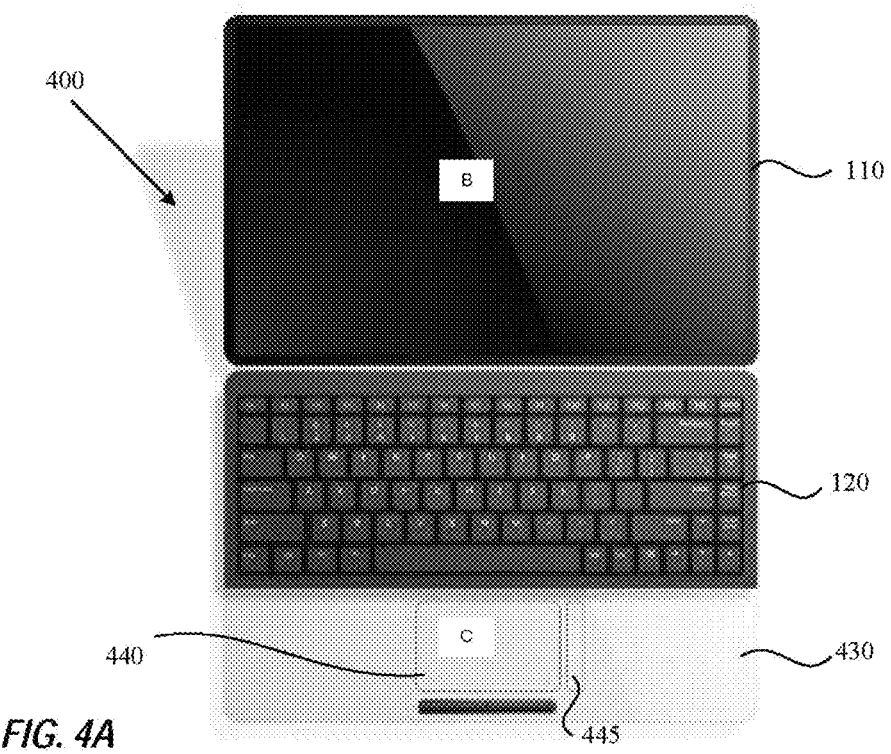
FIG. 4A illustrates an example lap top computer in an open configuration, according to one embodiment.

FIG. 4A illustrates an example lap top computer 400 in an open configuration. The computer 400 includes a transparent surface 430 that can present images thereon. The transparent surface 430 may include a transparent LCD (not separately illustrated) that generates the images presented thereon. The transparent surface 430 includes a trackpad 440 (enables user to guide cursor around the display 110) and a scroll bar 445 (enables users to scroll the image presented on the display up and down or possibly right and left) defined therein. The size and location of the trackpad 440 and the scroll bar 445 may be user configurable. The computer 400 may coordinate the images presented on the transparent surface 430, the touch interaction, and the responses thereto.

The images presented on the transparent surface 430 are not limited to any specific type of user interface. Rather, any type of user interface could be presented without departing from the current scope. The user interfaces presented may be user defined. Different user interface may be selected for different use cases. According to one embodiment, the computer 400 may have defined user interfaces for certain use cases. According to one embodiment, the applications running on the computer 400 may define the user interfaces that are presented. For example, use of a gaming program may result in certain images being presented on the transparent surface to aid in game play. The user may be able to reconfigure the user interface defined by the computer and/or applications running thereon to meet their needs. According to one embodiment, the user may define what user interface they want presented and/or may define what user interfaces they want associated with different use cases. Regardless of how the user interfaces are defined for the different use cases, when the computer 400 determines it is operating under a certain use case it may present the defined user interface(s).

Figure 4B:
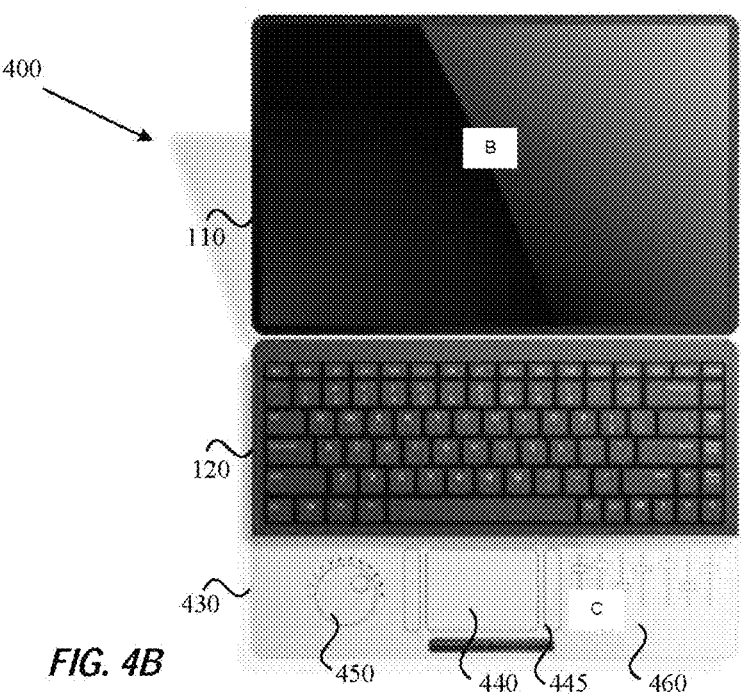
FIG. 4B illustrates an example transparent surface having additional user interfaces presented thereon, according to one embodiment.

FIG. 4B illustrates an example transparent surface 430 having additional user interfaces included thereon for a use case of music editing. The transparent surface 430 includes a rocker wheel 450 and a fader 460 in addition to the trackpad 440 and the scroll bar 445. The computer 400 may coordinate the user interfacing with the rocker wheel 450 and the fader 460 and the responses taken in response thereto. The music editing user interface may be the default user interface, the user may select when they want this user interface presented, or the computer 400 may determine when the user is performing, or is about to perform, music editing and may present the music editing user interface accordingly. While not illustrated a musical keyboard is another example of a user interface that may be presented on the transparent surface 430.

The images presented on the transparent surface 430 are not limited to user interfaces. Rather any type of image may be presented. For example, the transparent surface may present certain desktop accessories that are typically presented on the display 110 to free up display area. According to one embodiment, the computer 400 may select the desktop accessories that are presented (possibly based on monitoring what accessories the user utilizes). The user may be able to modify the presentation selected by the computer 400. According to one embodiment, the user may define what desktop accessory or desktop accessories they want presented.

Figure 4C:
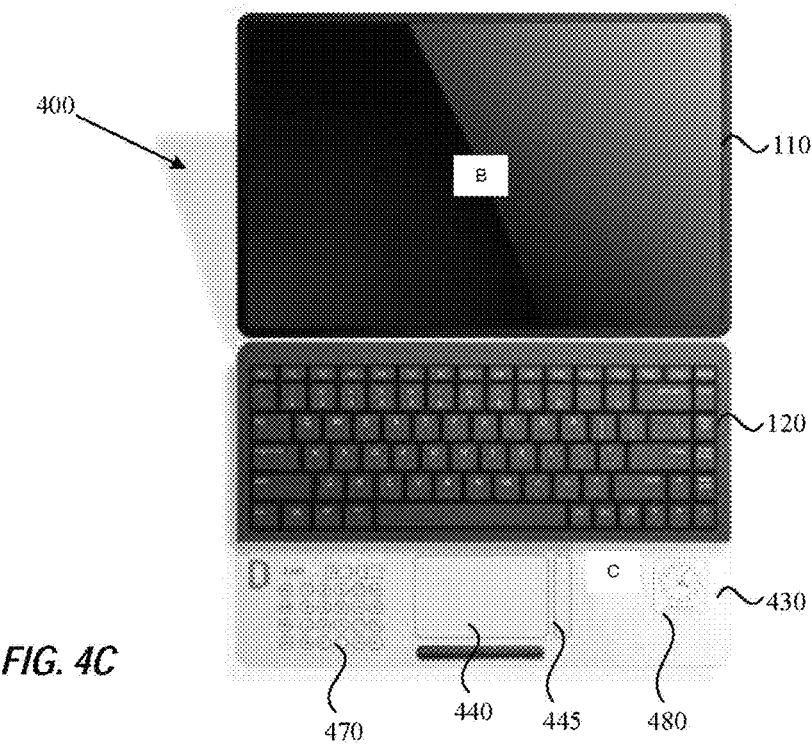
FIG. 4C illustrates an example transparent surface having desktop accessories pres thereon, according to one embodiment.

FIG. 4C illustrates an example transparent surface 430 having desktop accessories presented in addition to any user interfaces (e.g., touchpad 440). The transparent surface 430 may include a calculator (or keypad) 470 and a clock 480 in addition to the trackpad 440 and the scroll bar 445. As with the desktop accessories provided on the display 110 the desktop accessories provided on the transparent surface 430 may provide additional information or take certain actions if they are selected and/or utilized.

Figure 5:
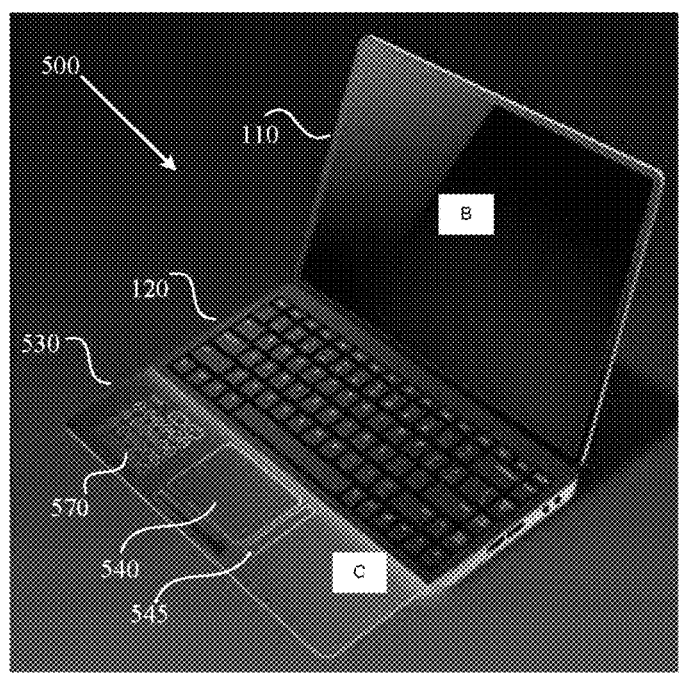
FIG. 5 illustrates an example lap top computer in an open configuration, according to one embodiment.

FIG. 5 illustrates an example lap top computer 500 in an open configuration. The computer 500 includes a transparent surface 530 to present images thereon and provide lighting. The transparent surface 530 may include a transparent LCD (not separately illustrated) and edge lighting (not separately illustrated) or it may include a transparent OLED (not separately illustrated) that generates the images and provides backlighting. The transparent surface 530 may provide the ability to see the images presented thereon in a dark environment. The transparent surface 530 may present any number of images including any number of user interfaces and/or desktop accessories. As illustrated, the transparent surface 530 may include a calculator 570 in addition to the trackpad 540 and the scroll bar 545.

The transparent surface 430, 530 is not limited to being presented on a bottom edge of the keyboard 120 (being bottom edge of base). Rather, the transparent surface could be located at various locations on the keyboard (could make up other portions of the base) without departing from the current scope.

Figure 6A:
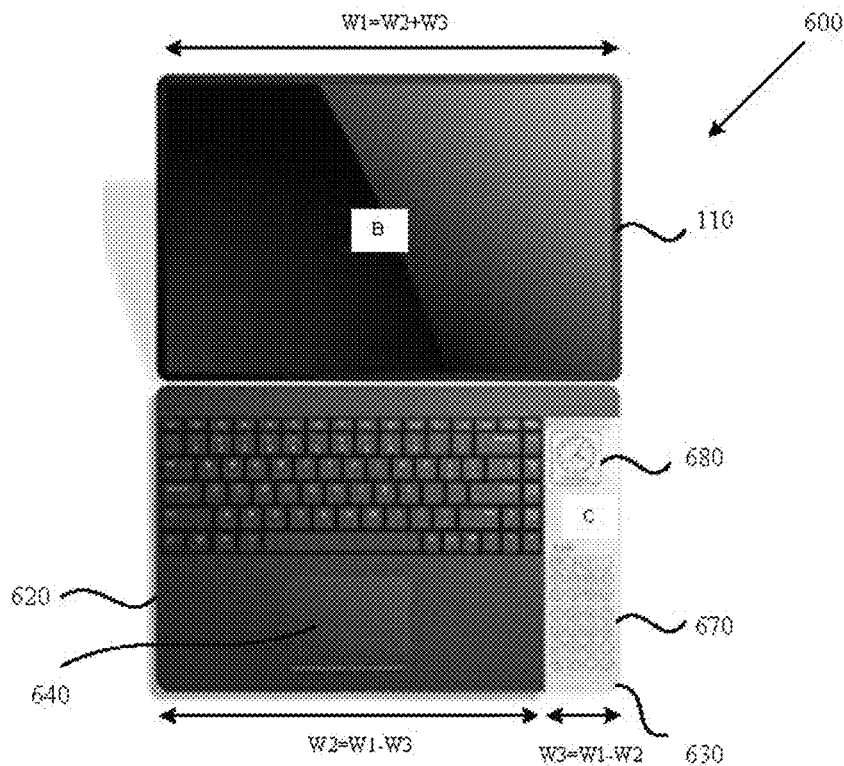
FIGS. 6A-B illustrate an example lap top computer in open and closed configurations respectively, according to one embodiment.
Figure 6B:
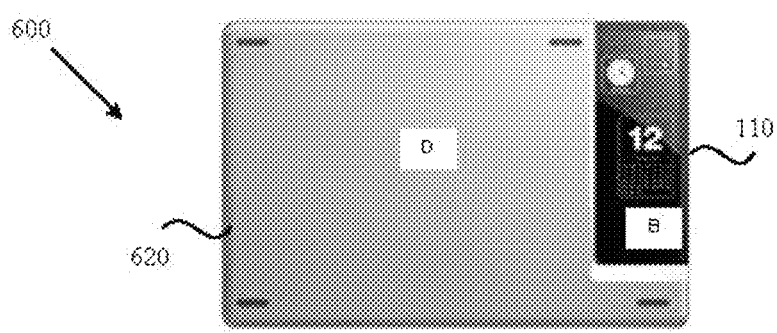

FIGS. 6A-B illustrate an example lap top computer 600 in open and closed configurations respectively. The computer 600 includes a keyboard 620 that has approximately the same height as the display. In addition to the keys the keyboard may include a touchpad 640. The keyboard 624) may have a width (W2) that is narrower than the width (W1) of the display 110 so that when closed the keyboard 620 would not cover the entire display 110. Extending from the side of the keyboard 620 is a transparent surface 630. The combined width (W2+W3) of the keyboard 620 and the transparent surface 630 is approximately the width of the display 110. When in the open configuration the transparent surface 630 presents various images thereon such as calculator 670 and a clock 680. When in a closed configuration, the transparent surface 630 may allow the display 110 to be seen therethrough.

As previously discussed, for example with respect to FIGS. 1A-B, the computer 600 may power down other portions of the display or power up only that portion when the computer 600 is being used in a closed configuration. In addition the backlighting of the display may be selectively shut down. The content displayed on this portion of the display 110 may vary from general information (e.g., calendar, clock), to more specific information (e.g., to do lists, list of emails received, documents being worked on), to specific items being worked on or viewed likely in reduced size (e.g., documents, Internet). The information presented may depend on how the computer 600 entered this anode of operation. The information presented may be user defined, may be standard, or the user may configure the information provided. The computer 600 may determine the orientation thereof (e.g., landscape, portrait) when being used in the closed mode and adjust the contents presented on the display 110 accordingly.

According to one embodiment, a transparent layer may provide an image of the keyboard thereon so that an actual keyboard having keys is not required. The entire base of the computer (C and D surfaces) could be the transparent layer. In such an arrangement, the entire display may be visible in a closed environment. Such a configuration could be utilized as a laptop in an open environment and a tablet in a closed environment.

Figure 7A:
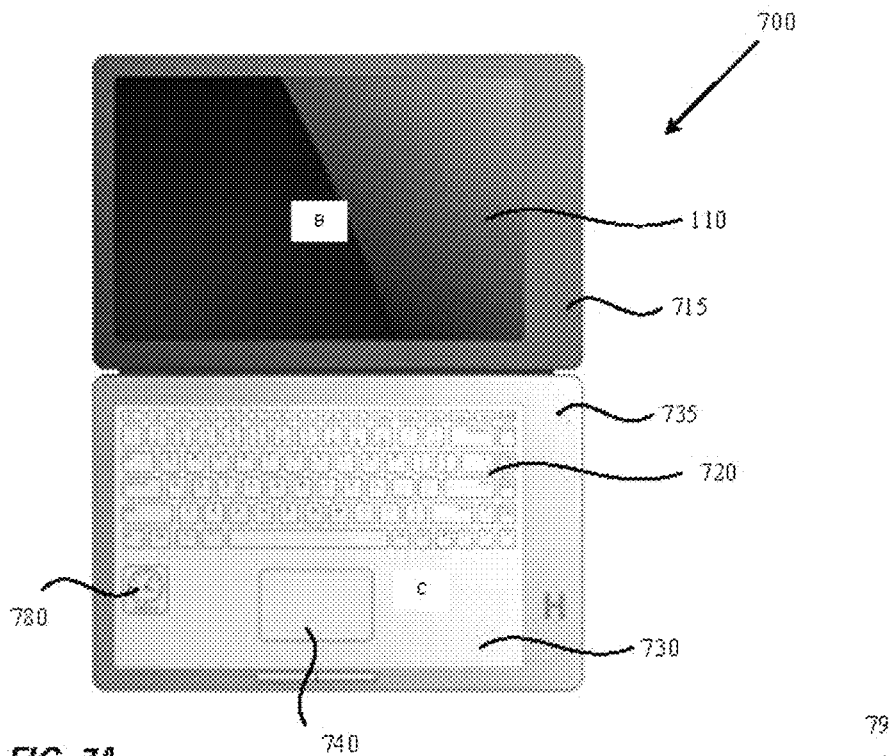
FIGS. 7A-E illustrate various embodiments of a convertible laptop/tablet computer, according to one embodiment.

FIGS. 7A-E illustrate various embodiments of a convertible laptop/tablet computer 700. FIG. 7A illustrates the computer 700 in an open configuration. The computer 700 includes an upper frame (lid) 715 securing the display 110 and a lower frame (base) 735 securing a transparent layer 730. The transparent layer 730 may be configured to be substantially the same size as the display 110. The transparent layer 730 may have an image of a keyboard 720 presented thereon so that it may act as the keyboard. In addition, the transparent layer 730 may include other images presented thereon that may act as user interfaces, desktop accessories or the like. As illustrated, the transparent layer 730 includes a touchpad 740 and a clock 780. The computer 700 may coordinate the images presented on the transparent surface 730 the touch interaction, and the responses thereto. For example, pressing the keys on the keyboard 720 presented on the transparent layer 730 will result in the keys being selected.

Figure 7B:
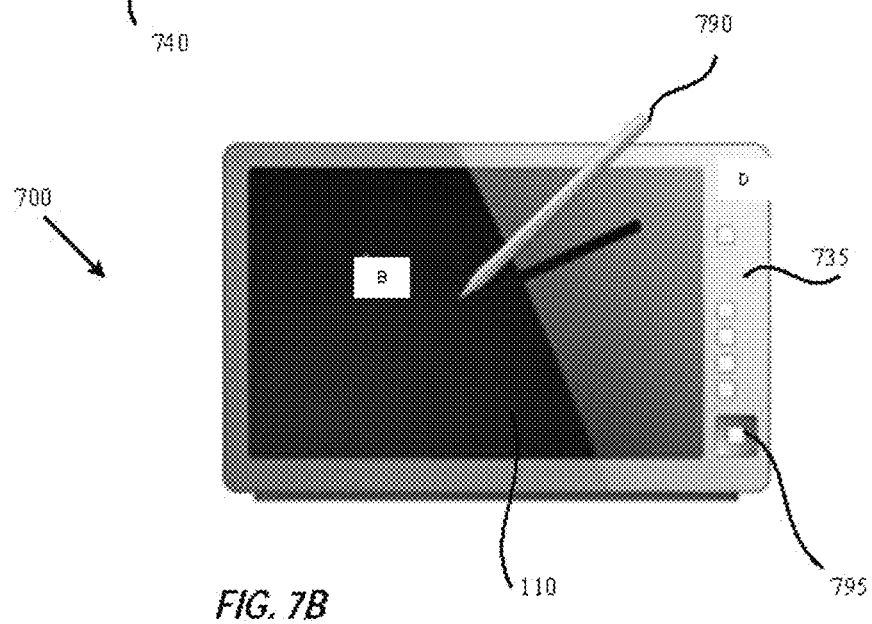

FIG. 7B illustrates the computer 700 in a closed configuration. The display 110 is visible through the transparent layer 730. The transparent layer 730 acts as a touchscreen. A stylus 790 is illustrated as being used to interface with the touchscreen 730. As previously noted the transparent surface (touchscreen) 730 may be touch-sensitive to, for example, a user's finger, a stylus, a pen, or some combination thereof. The base 735 may include user interfaces (e.g., buttons) 795 built in the lower surface that may provide various functions.

Figure 7C:
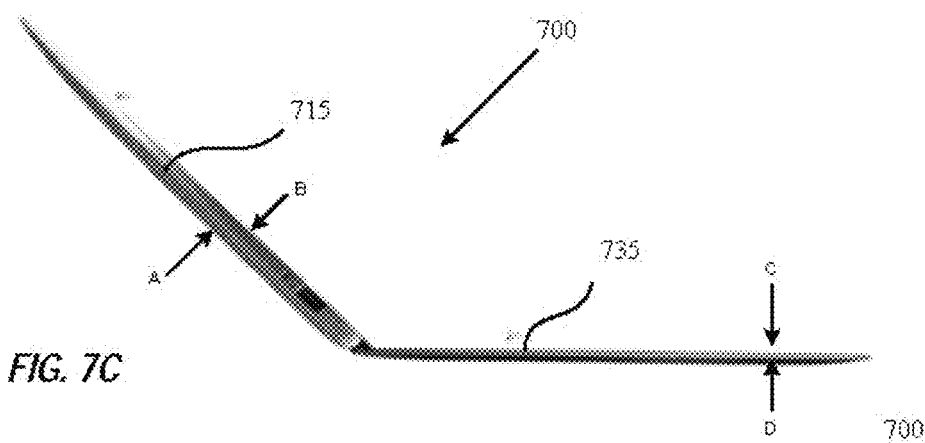
Figure 7D:
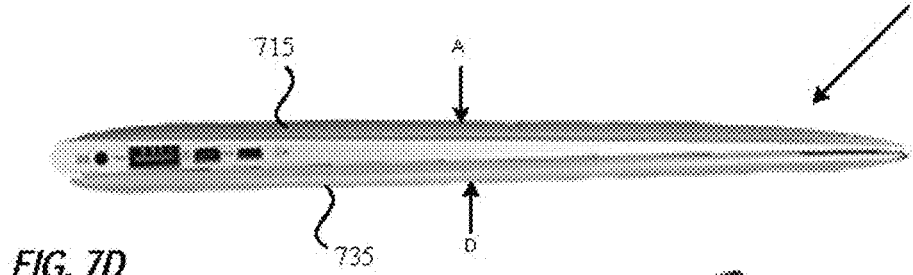
Figure 7E:
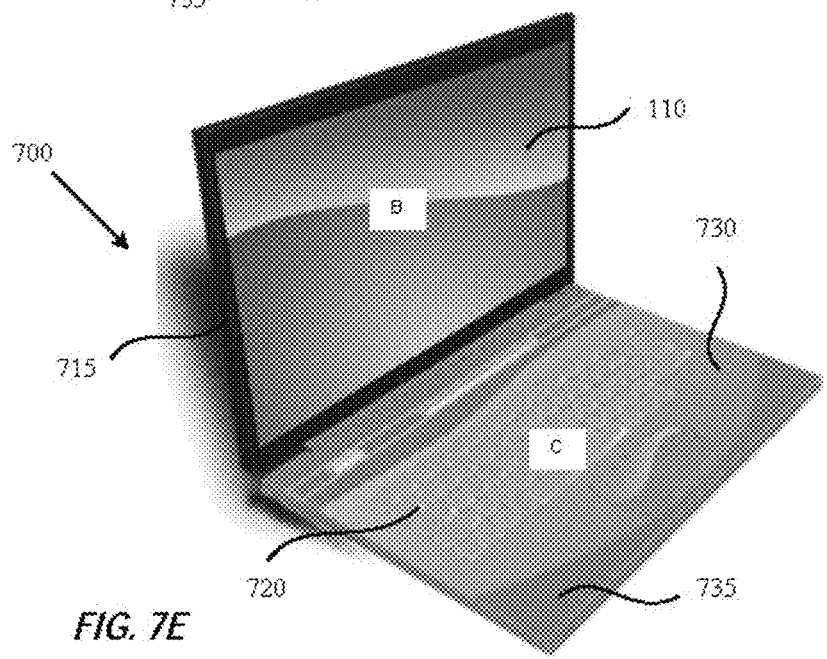

FIG. 7C illustrates a side view of the computer 700 in an open configuration where the lid 715 extends at an angle greater than ninety degrees (90°) from the base 735. FIG. 7D illustrates a side view of the computer 700 in a closed configuration where the lid 715 is laying on the base 735. FIG. 7E illustrates a perspective view of the computer 700 in an open configuration showing the display 110 within the lid 715 and the transparent surface 730 displaying the keyboard 720 within the base 735.

Figure 8:
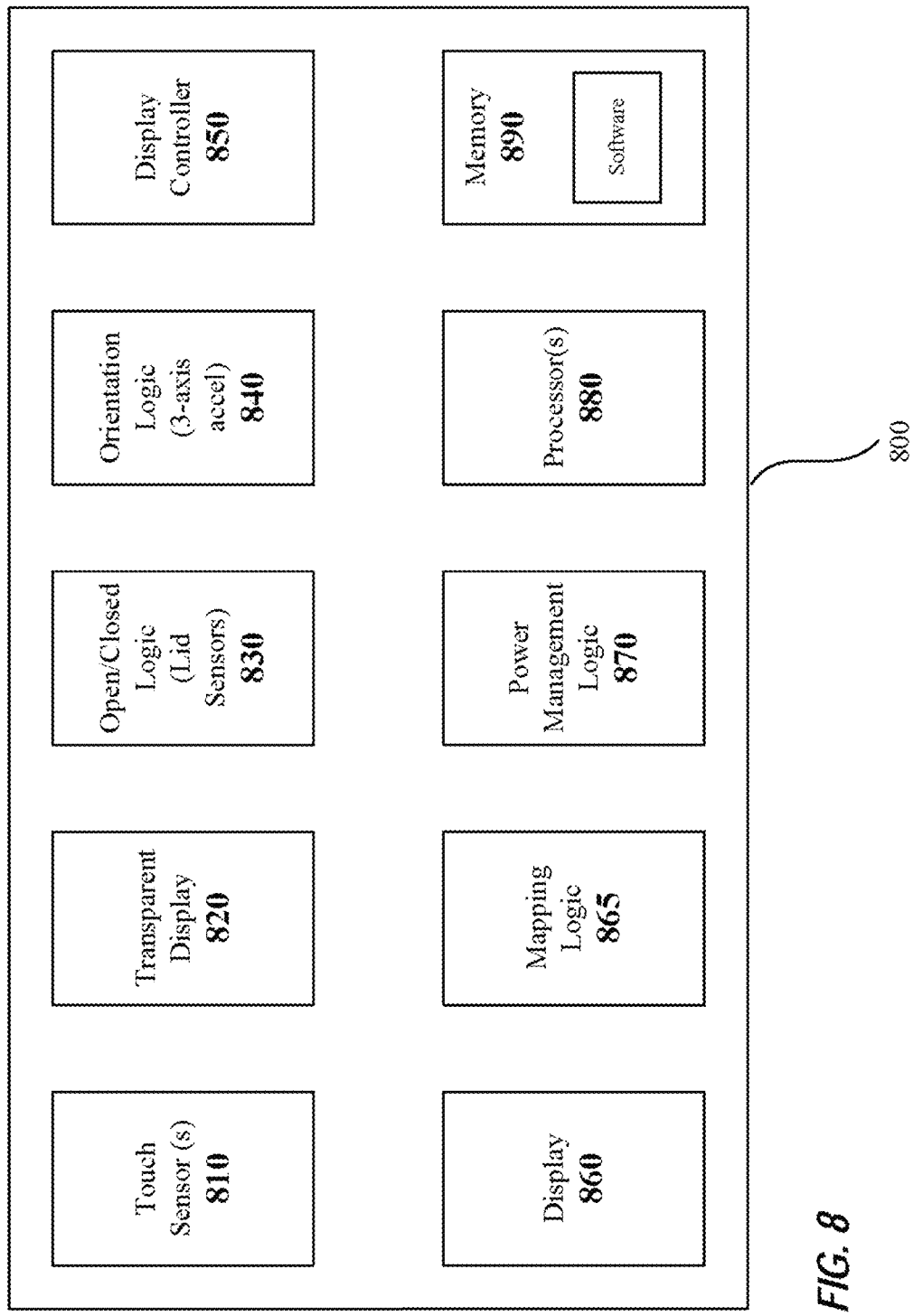
FIG. 8 illustrates an example system diagram for a laptop computer maintaining at least partial functionality in a closed configuration, according to one embodiment.

FIG. 8 illustrates an example system diagram for a laptop computer 800 maintaining at least partial functionality in a closed configuration. The computer 800 includes a transparent display 810, one or more transparent touch sensors 820, logic to determine if the computer is in an open/closed configuration 830, logic to determine an orientation of the computer in a closed configuration 840, a display controller 850, a display 860, logic to map touch interactions to the display 865, power management logic 870, one or more processors 880, and memory including a non-transitory processor readable storage medium 890.

The processor(s) 880 control the operation of the computer 800. The non-transitory processor readable storage medium 890 may include software that when executed by the processors) 880 cause the processors to take certain actions including running various programs selected by a user to perform the functions the user desires to have performed. The logic to determine if the computer is in an open/closed configuration 830 may include sensors located at the corners of the B and C surface to determine if the surfaces are in close proximity to each other. A determination that the B and C surfaces are in close proximity indicates the computer 800 is in a closed configuration and a determination that they are not in closed proximity indicates the computer 800 is in an open configuration.

If the computer 800 is in an open configuration, the display controller 850 presents appropriate content on the display 860. In the open configuration the touch sensor 820 associated with the C surface is activated. The transparent display 810 displays one or more images therein, wherein the images may include one or more user interfaces and possibly one or more desktop accessories. The images presented may be based on the applications running on the computer 800. The mapping logic 865 may map the user interactions with the touch sensor 820 to the display 860 as touchpad interactions.

If the computer 800 is in a closed configuration, the display controller 850 presents appropriate content on the display 860 based on the portion of the display that is visible. The power management logic 870 may power off portions of the display 860 that are covered by the base (not visible through the transparent portion of the D surface). The power management logic 860 may also selectively power off the backlighting of the display 860. In the closed configuration the touch sensor 820 associated with the D surface is activated. The mapping logic 865 may map the user interactions with the touch sensor 820 to the display 860 as touchscreen interactions. The orientation logic 840 may include a three-axis accelerator to determine the orientation (e.g., landscape, portrait) of the computer 800 in the closed environment. The display controller 850 may modify the orientation of the content being presented on the display 860 based thereon.

Although the disclosure has been illustrated by reference to specific embodiments, it be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. An apparatus, comprising:
a display housing;
a primary display device supported by the display housing, wherein the primary display device is to display content;
a base housing coupled to the display housing, the display housing and the base housing being rotatable between an open configuration and a closed configuration; and
a transparent touch sensitive user interface display device supported by the base housing, the transparent touch sensitive user interface display device including:
a first touch screen interface to detect a first touch input when the display housing and the base housing are in the open configuration;
a second touch screen interface to detect a second touch input when the display housing and the base housing are in the closed configuration; and
a transparent display disposed between the first touch screen interface and the second touch screen interface,
wherein the transparent touch sensitive user interface display device is configured such that:

the transparent touch sensitive user interface display device detects whether the display housing and the base housing are in the open configuration or the closed configuration;

based on the detection, the transparent touch sensitive user interface display device interprets touches on the first touch screen interface as touches on a touchpad when the display housing and the base housing are in the open configuration, and interpret touches on the second touch screen interface as touches on a touchscreen when the display housing and the base housing are in the closed configuration;

the transparent display generates and displays a user interface in shape of a trackpad on a portion of the transparent display that is visible on a portion of the first touch screen interface when the display housing and the base housing are in the open configuration;

the first touch screen interface, receives the first touch input on the trackpad that is visible on the portion thereof when the display housing and the base housing are in the open configuration, wherein the trackpad is to enable a user to guide a cursor around the primary display device;

content displayed on a portion of the primary display device aligned with the transparent touch sensitive display device when the display housing and the base housing are in the closed configuration is visible through the second touch screen interface when the display housing and the base housing are in the closed configuration; and the second touch screen interface acts as a touch screen for the portion of the primary display device by receiving the second touch input when the display housing and the base housing are in the closed configuration.

2. The apparatus of claim 1, wherein the first touch screen interface includes a first touch screen surface and a first touch sensor and the second touch screen interface includes a second touch screen surface and a second touch sensor.

3. The apparatus of claim 1, wherein the transparent display is a transparent liquid crystal display (LCD).

4. The apparatus of claim 1, wherein the transparent display is a transparent organic light emitting diode (OLED) display.

5. The apparatus of claim 1, further comprising logic, the logic at least partially including hardware logic, configured to identify whether the display housing and the base housing are in the open configuration or the closed configuration.

6. The apparatus of claim 5, further comprising logic, the logic at least partially including hardware logic, configured to map the second touch input associated with the second touch screen interface to the associated location on the portion of the primary display device when the display housing and the base housing are in the closed configuration.

7. The apparatus of claim 5, further comprising logic, the logic at least partially including hardware logic, configured to map the first touch input associated with the first touch screen interface to the trackpad displayed thereon, and perform the appropriate action associated with the trackpad on the content being displayed on the primary display device when the display housing and the base housing are in the open configuration.

8. The apparatus of claim 5, further comprising a non-transparent user interface supported by the base housing, wherein a portion of the primary display device aligned with the non-transparent user interface is not visible when the display housing and the base housing are in the closed configuration.

9. The apparatus of claim 1, wherein the transparent display further generates and displays an additional user interface that is visible on the first touch screen interface when the display housing and the base housing are in the open configuration.

10. The apparatus of claim 9, wherein the additional user interface generated and displayed on the transparent display includes a keyboard.

11. The apparatus of claim 9, wherein the additional user interface generated and displayed on the transparent display is to be selected based on operations of the apparatus.

12. The apparatus of claim 1, wherein the transparent display is further to generate and display one or more desktop accessories that are visible on the first touch screen interface when the display housing and the base housing are in the open configuration.

13. An apparatus, comprising:
a display housing having a primary display supported thereby, wherein the primary display is to display content;
a base housing having one or more user interface devices supported thereby, wherein at least one of the one or more user interface devices is to be provided by a transparent touch sensitive display device, wherein the transparent touch sensitive display device is to generate and display a user interface device in shape of a trackpad on a portion of the transparent touch sensitive display device, wherein the base housing is coupled to the display housing such that the display housing and the base housing are rotatable between an open configuration and a closed configuration, and wherein the transparent touch sensitive display device is configured to:
display the trackpad on the portion of the transparent touch sensitive display device when the display housing and the base housing are in the open configuration;
receive a first touch input on the trackpad displayed on the portion of the transparent touch sensitive display device when the display housing and the base housing are in the open configuration, wherein the trackpad is to enable a user to guide a cursor around the primary display;
enable the content presented on a portion of the primary display aligned with the transparent touch sensitive display device when the display housing and the base housing are in the closed configuration to be visible through the transparent touch sensitive display device when the display housing and the base housing are in the closed configuration;
receive a second touch input on the transparent touch sensitive display device when the display housing and the base housing are in the closed configuration in order to act as a touch screen for the portion of the primary display; and
logic, the logic at least partially including hardware logic, configured to identify whether the display housing and the base housing are in the open configuration or the closed configuration, wherein the transparent touch sensitive display device is further configured, based on the logic, to interpret touches on the first touch screen interface as touches on a touchpad when the display housing and the base housing are in the open configuration, and interpret touches on the second touch screen interface as touches on a touchscreen when the display housing and the base housing are in the closed configuration.

14. The apparatus of claim 13, wherein the transparent touch sensitive display device includes
    a first touch screen interface to detect the first touch input when the display housing and the base housing are in the open configuration;
    a second touch screen interface to detect the second touch input when the display housing and the base housing are in the closed configuration; and
    a transparent display disposed between the first touch screen interface and the second touch screen interface to generate and display the trackpad on a portion thereof when the display housing and the base housing are in the open configuration, wherein the trackpad is visible on a portion of the first touch screen interface.

15. The apparatus of claim 14, further comprising logic, the logic at least partially including hardware logic, configured to map the second touch input associated with the second touch screen interface to the associated location on the portion of the primary display when the display housing and the base housing are in the closed configuration.

16. The apparatus of claim 14, further comprising logic, the logic at least partially including hardware logic, configured to reduce power to the primary display by not powering a portion of the primary display not covered by the transparent touch sensitive display device when the display housing and the base housing are in the closed configuration.

17. The apparatus of claim 14, further comprising logic, the logic at least partially including hardware logic, configured to map the first touch input associated with the first touch screen interface to the trackpad displayed on the portion thereof, and perform the appropriate action associated with
    the trackpad on the content being displayed on the primary display when the display housing and the base housing are in the open configuration.

18. The apparatus of claim 14, wherein the transparent display is further to generate and display one or more desktop accessories.

19. The apparatus of claim 13, wherein the transparent touch sensitive display device is to generate and display an additional user interface when the display housing and the base housing are in the open configuration.

20. The apparatus of claim 19, wherein the additional user interface is a keyboard.

21. The apparatus of claim 19, wherein the additional user interface is to be selected based on operations of the apparatus.

22. An apparatus, comprising:
    a display housing having a primary display supported thereby, wherein the primary display is to display content;
    a base housing having a transparent touch sensitive display device supported thereby, wherein the base housing is coupled to the display housing such that the display housing and the base housing are rotatable between an open configuration and a closed configuration, wherein the transparent touch sensitive display device is configured to:
        generate and display a user interface in shape of a trackpad on a portion of the transparent touch sensitive display device when the display housing and the base housing are in an open configuration,
        detect a first touch input on the trackpad displayed on the portion of the transparent touch sensitive display device when the display housing and the base housing are in the open configuration, wherein the trackpad is to enable a user to guide a cursor around the primary display,
        enable the content presented on a portion of the primary display aligned with the transparent touch sensitive display device when the display housing and the base housing are in the closed configuration to be visible through the transparent touch sensitive display device when the display housing and the base housing are in the closed configuration,
        detect a second touch input on the transparent touch sensitive display device when the display housing and the base housing are in the closed configuration in order to act as a touch screen for the portion of the primary display; and
    logic, the logic at least partially including hardware logic, configured to identify whether the display housing and the base housing are in the open configuration or the closed configuration, wherein the transparent touch sensitive display device is further configured, based on the logic, to interpret touches on the first touch screen interface as touches on a touchpad when the display housing and the base housing are in the open configuration, and interpret touches on the second touch screen interface as touches on a touchscreen when the display housing and the base housing are in the closed configuration.

23. The apparatus of claim 22, wherein the transparent touch sensitive display device includes
    a first touch screen interface to detect the first touch input;
    a second touch screen interface to detect the second touch input; and
    a transparent display disposed between the first touch screen interface and the second touch screen interface to generate and display the trackpad on a portion thereof when the display housing and the base housing are in the open configuration, wherein the trackpad is visible on a portion of the first touch screen interface.

24. The apparatus of claim 23, wherein the apparatus operates as a laptop computer when the display housing and the base housing are in the open configuration, and further comprising logic, the logic at least partially including hardware logic, configured to map the first touch input to the trackpad displayed on the portion thereof and perform the appropriate action associated with the trackpad on the content being displayed on the primary display when the display housing and the base housing are in the open configuration.

25. The apparatus of claim 22, wherein the apparatus operates as a tablet when the display housing and the base housing are in the closed configuration, and further comprising
    logic, the logic at least partially including hardware logic, configured to map the second touch input to the associated location on the portion of the primary display as a touchscreen interaction when the display housing and the base housing are in the closed configuration; and
    logic, the logic at least partially including hardware logic, configured to determine an orientation of the apparatus and to configure the primary display based on the orientation of the apparatus when the display housing and the base housing are in the closed configuration.

26. The apparatus of claim 22, wherein the transparent touch sensitive display device is to display an additional user interface when the display housing and the base housing are in the open configuration.

27. The apparatus of claim 26, wherein the additional user interface is a keyboard.

28. The apparatus of claim 26, wherein the additional user interface is to be selected based on operations of the apparatus.

29. The apparatus of claim 22, wherein the transparent touch sensitive display device is further to generate and display one or more desktop accessories when the display housing and the base housing are in the open configuration.

\* \* \* \* \*